(12) United States Patent
Yan et al.

(10) Patent No.: US 8,239,334 B2
(45) Date of Patent: Aug. 7, 2012

(54) LEARNING LATENT SEMANTIC SPACE FOR RANKING

(75) Inventors: Jun Yan, Beijing (CN); Ning Liu, Beijing (CN); Lei Ji, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 12/344,093

(22) Filed: Dec. 24, 2008

(65) Prior Publication Data

US 2010/0161596 A1 Jun. 24, 2010

(51) Int. Cl.
| | |
|---|---|
| G06E 1/00 | (2006.01) |
| G06E 3/00 | (2006.01) |
| G06F 15/18 | (2006.01) |
| G06F 7/00 | (2006.01) |
| G06F 17/00 | (2006.01) |
| G06G 7/00 | (2006.01) |

(52) U.S. Cl. .......................................... 706/16; 707/705
(58) Field of Classification Search ...................... 706/16
See application file for complete search history.

(56) References Cited

U.S. PATENT DOCUMENTS

| | | | |
|---|---|---|---|
| 6,654,740 | B2 | 11/2003 | Tokuda et al. |
| 7,251,637 | B1 | 7/2007 | Caid et al. |
| 7,356,187 | B2 | 4/2008 | Shanahan et al. |
| 2006/0224584 | A1 | 10/2006 | Price |
| 2007/0067281 | A1 | 3/2007 | Matveeva et al. |
| 2007/0217676 | A1* | 9/2007 | Grauman et al. ............. 382/170 |
| 2007/0294241 | A1 | 12/2007 | Surendran et al. |

FOREIGN PATENT DOCUMENTS

WO  WO2008069791 A1  6/2008

OTHER PUBLICATIONS

Learning the Latent Semantic Space for Ranking in Text Retrieval Jun Yan, Shuicheng Yan, Ning Liu, Zheng Chen Dec. 15-19, 2008, Eigth IEEE International Conference on Data Mining.*
Chakraborti, et al, "Supervised Latent Semantic indexing Using Adaptive Sprinkling", submitted Oct. 11, 2006.
Dumais, Latent Semantic Indexing (LSI) and TREC-2 (1994).
Dumais, "LSI meets TREC: A Status Report" (1993).
Faloutsos, et al., "A Survey of Information Retrieval and Filtering Methods" Aug. 1995.
Greengrass, "Information Retrieval: ASurvey" Nov. 30, 2000.
Roweis, et al., "Nonlinear Dimensionality Reduction by Locally linear Embedding" www.sciencemag.org, Science vol. 290, Dec. 22, 2000.
SIGIR 2007 Workshop: Learning to Rank for Information Retrieval, <http://research.microsoft.com/users/LRrIR-2007/>>.

(Continued)

*Primary Examiner* — Alan Chen
*Assistant Examiner* — Ababacar Seck
(74) *Attorney, Agent, or Firm* — Lee & Hayes, PLLC

(57) ABSTRACT

A tool facilitating learning latent semantics for ranking (LLSR) tailored to the ranking task via leveraging relevance information of query-document pairs to learn a tailored latent semantic space such that other documents are better ranked for the queries in the subspace. The tool applying a learning latent semantics for ranking algorithm integrating LLSR, thereby enabling learning an optimal latent semantic space (LSS) for ranking by utilizing relevance information in the training process of subspace learning. The tool enabling an optimization of the LSS as a closed form solution and facilitating reporting the learned LSS.

20 Claims, 7 Drawing Sheets

OTHER PUBLICATIONS

Tenenbaum, et al., "A Global Geometric Framework for Nonlinear Dimensionality Reduction", www.sciencemag.org, Science, vol. 290, Dec. 22, 2000.

The Lemur Project, The Lemur Toolkit for Language Modeling and Information Retrieval, Last modified: Oct. 21, 2008, 18:03:36 pm.

Wiener, et al. "A Neural Network Approach to Topic Spotting" (1995).

Bartell, et al., "Latent Semantic Indexing is an Optimal Special Case of Multidimensional Scaling", retrieved on Nov. 28, 2008 at <<http://delivery.acm.org/10.1145/140000/133191/p161-bartell.pdf?key1=133191&key2=3453118221&coll=GUIDE&dl=GUIDE&CFID=13362401&CFTOKEN=39673990>>, ACM SIGIR Conference on Research and Development in Information Retrieval, 1992, pp. 161-167.

Bast, et al., "Why Spectral Retrieval Works", retrieved on Nov. 28, 2008 at <<http://www.mpi-inf.mpg.de/~bast/papers/lsiexplained.pdf>>, ACM SIGIR Conference on Research and Development in Information Retrieval, 2005, pp. 11-18.

Cai, et al., "Orthogonal Locality Preserving Indexing", retrieved on Nov. 28, 2008 at <<http://delivery.acm.org/10.1145/1080000/1076039/p3-cai.pdf?key1=1076039&key2=6643118221&coll=GUIDE&dl=GUIDE&CFID=13362314&CFTOKEN=24760597>>, ACM SIGIR Conference on Research and Development in Information Retrieval, 2005, pp. 3-10.

Deerwester, et al., "Indexing by Latent Semantic Analysis", retrieved on Nov. 28, 2008 at <<http://lsi.research.telcordia.com/lsi/papers/JASIS90.pdf>>, Journal of the American Society for Information Science, vol. 41, 1990, pp. 391-407.

Ding, "A Probabilistic Model for Latent Semantic Indexing", retrieved on Nov. 28, 2008 at <<http://ranger.uta.edu/~chqding/papers/lsilong6.pdf>>, John Wiley & Sons, Inc., Journal of the American Society for Information Science and Technology, vol. 56, No. 6, 2005, pp. 597-608.

Dumais, "Combining Evidence for Effective Information Filtering", retrieved on Nov. 28, 2008 at <<http://citeseerx.ist.psu.edu/viewdoc/download?doi=10.1.1.40.2793&rep=rep1&type=pdf>>, AAAI Technical Report SS-96-05 (Spring Symposium on Machine Learning and Information Retrieval), 1996, pp. 26-30.

Dumais, et al., "Automatic Cross-Linguistic Information Retrieval using Latent Semantic Indexing", retrieved on Nov. 28, 2008 at <<http://citeseerx.ist.psu.edu/viewdoc/download?doi=10.1.1.54.5378&rep=rep1&type=pdf>>, AAAI Technical Report SS-97-05, SIGIR Workshop on Cross-Linguistic Information Retrieval, 1996, pp. 16-23.

He, et al., "Locality Preserving Indexing for Document Representation", retrieved on Nov. 28, 2008 at <<http://research.microsoft.com/asia/dload_files/group/ims/23.pdf, ACM SIGIR Conference on Research and Development in Information Retrieval, 2004, pp. 96-103.

Hofmann, "Probabilistic Latent Semantic Indexing", retrieved on Nov. 28, 2008 at <<http://www.cs.brown.edu/~th/papers/Hofmann-SIGIR99.pdf, ACM SIGIR Conference on Research and Development in Information Retrieval, 1999, pp. 50-57.

Jiang, et al., "Information Filtering Using the Riemannian SVD (R-SVD)", retrieved on Nov. 28, 2008 at <<http://www.springerlink.com/content/5243477221q16r23/fulltextpdf>>, Springer-Verlag, Proceedings of International Symposium on Solving Irregularly Structured Problems in Parallel, vol. 1457, 1998, pp. 386-395.

Li, et al., "SIGIR Workshop Report: Learning to Rank for Information Retrieval (LR4IR 2008)", retrieved on Nov. 28, 2008 at <<http://www.sigir.org/forum/2008D/sigirwksp/2008d_sigirforum_li.pdf, ACM SIGIR Forum, Workshop reports, vol. 42, No. 2, 2008, pp. 76-79.

Liu, "Supervised Locality Preserving Indexing for Text Categorization", retrieved on Nov. 28, 2008 at <<http://sifaka.cs.uiuc.edu/course/598cxz05s/report-hliu.pdf>>, Tech Report for Course CS 598, University of Illinois at Urbana-Champaign, 2005, pp. 1-20.

Rohde, "SVDLIBC, Doug Rohde's SVD C Library, version 1.34", retrieved on Dec. 1, 2008 at <<http://tedlab.mit.edu/~dr/SVDLIBC/>>, 2008, pp. 1-4.

Sun, et al., "Supervised Latent Semantic Indexing for Document Categorization", retrieved on Nov. 28, 2008 at <<http://ieeexplore.ieee.org/stamp/stamp.jsp?arnumber=1410354&isnumber=30565>>, IEEE International Conference on Data Mining (ICDM), 2004, pp. 1-4.

Tang, et al., "On Scaling Latent Semantic Indexing for Large Peer-to-Peer Systems", retrieved on Nov. 28, 2008 at <<http://www.tel.fer.hr/files/poslijediplomski/mmta/Scaling_pSearch-SIGIR04.pdf, ACM SIGIR Conference on Research and Development in Information Retrieval (session: Dimensionality reduction), 2004, pp. 112-121.

Zhou, et al., "Comparing Discriminating Transformations and SVM for Learning during Multimedia Retrieval", retrieved on Nov. 28, 2008 at <<http://www.ifp.uiuc.edu/~xzhou2/Research/papers/Selected_papers/ACM_MM01.pdf, ACM Conference on Multimedia (Session: Video Retrieval and Browsing), 2001, pp. 137-146.

* cited by examiner

LEARNING LATENT SEMANTIC SPACE FOR RANKING

BACKGROUND

Text matching is a process used for searching textual documents based on an input query and retrieving relevant textual documents as a result of the query. Text mining and text retrieval has previously been accomplished via a Vector Space Model (VSM). Subspace learning algorithms, such as Latent Semantic Indexing (LSI) and Locality Preserving Indexing (LPI), are used to uncover the underlying associations among the terms by representing the text corpus in a more semantic manner. These algorithms generally project the text documents from a high-dimensional term space into another lower-dimensional feature subspace, known as a latent semantic space or concept space.

The purpose of subspace learning algorithms is to transform or map the original high-dimensional data into another lower-dimensional feature subspace. According to the property of the mapping function, subspace learning algorithms may be classified into linear and nonlinear algorithms. Historically, linear subspace learning algorithms, such as Principal Component Analysis (PCA), Linear Discriminant Analysis (LDA), Latent Semantic Indexing (LSI), and Locality Preserving Indexing (LPI), have been used in text processing. Whereas nonlinear algorithms, such as the Locally Linear Embedding (LLE) and Laplacian Eigen maps, are seldom used for text representation due to their high computational complexity.

Different subspace learning algorithms are optimized for different goals. For instance, Principal Component Analysis (PCA) was commonly used for unsupervised clustering problems and the Linear Discriminant Analysis (LDA) was used for classification problems. In text retrieval, the ranking problem is important for practical applications. Latent Semantic Indexing (LSI) has been used for data representation in ranking tasks.

Classical Latent Semantic Indexing (LSI), originally proposed for handling the problems of synonymy (the state of more than one word having the same meaning, i.e., being synonyms) and polysemy (the state of one word having more than one meaning), is a subspace learning algorithm that has proven effective in improving the algorithmic ranking performance in document retrieval when utilized for the information retrieval tasks. However, classical LSI was designed in terms of unsupervised learning, and thus the label information of the text documents was ignored in the learned latent semantics.

Traditional Latent Semantic Indexing (LSI) aims to project the text documents, i.e., the m-dimensional document vectors, into another lower-dimensional feature space through Singular Value Decomposition (SVD).

Suppose the SVD of the term by document matrix D of a text corpus is $D=U\Sigma V^T$, where the columns of $U \in R^{m \times m}$ and $V \in R^{n \times n}$ are the left and right orthogonal matrices of D respectively. $\Sigma \in R^{m \times n}$ is a diagonal matrix whose diagonal elements are the singular values of matrix D sorted in a decreasing order. $U_p \in R^{m \times p}$ and $V_p \in R^{n \times p}$ are used to represent the matrices consisting of the first p column vectors of U and V. Let $\Sigma_p \in R^{p \times p}$ stand for a p by p up-left block of the matrix $\Sigma$. The matrix D is projected to a p dimensional space by $D'=\Sigma_p^{-1}U_p^T D=\Sigma_p^{-1}U_p^T U\Sigma V^T=V_p^T \in R^{p \times n}$, is the representation of the n text documents in the lower-dimensional space.

Each row vector of the matrix D' stands for a latent semantic. Since $\Sigma_p^{-1}$ is a diagonal matrix, it will not affect the direction of the semantic vectors in D'. It is a rescaling matrix to rescale $d_i'$, i=1, 2, ..., n, which reflects the importance of each latent semantic. $D'=\Sigma_p^{-1}U_p^T D=\Sigma_p^{-1}U_p^T U\Sigma V^T=V_p^T \in R^{p \times n}$ tells us that the traditional LSI aims to compute a linear projection matrix $U_p \in R^{m \times p}$, where p is the number of latent semantics (usually p<<m), such that all documents can be projected into the p dimensional feature space through $U_p^T D$. After rescaling, $d_i'=\Sigma_p^{-1}U_p^T d_i$, i=1, 2, ..., n.

Let q be a given user query and also represented in the VSM. If we project q to the same lower-dimensional feature space by $q'=\Sigma_p^{-1}U_p^T q \in R^p$, then the relevance between query q and document $d_i$ is generally calculated by a similarity or dissimilarity measurement. As an example, the traditional LSI uses the Cosine similarity, $$\text{Cos} <q', d_i'> = \frac{<q', d_i'>}{\|q'\|\|d_i'\|},$$

where $\|\cdot\|$ stands for Frobenius norm of a vector. The projected lower-dimensional space represented by $U_p$ in traditional LSI is generally called as the latent semantic space. It is a linear vector space spanned by the column vectors of $U_p$. This latent semantic space learned by LSI is widely used for IR tasks.

Previously a Supervised LSI has been proposed to incorporate label information of text documents for text classification by adaptive sprinkling, and a Local LSI and Global LSI have been combined for text classification, such as by neural network models. User feedback has been incorporated into LSI via Robust Singular Value Decomposition (R-SVD). However, these conventional classification techniques are not tailored to the ranking task.

SUMMARY

A method and system for leveraging the labeled relevance information in the training process of subspace learning, such that the learned latent semantic space is tailored to the ranking problem is described herein. In an aspect of at least one embodiment, the latent semantic space for the ranking tasks is found by leveraging the labeled query-document pairs with relevance information, thereby discovering and developing a new application of Learning Latent Semantics for Ranking (LLSR) a subspace learning algorithm tailored to the ranking task.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The same numbers are used throughout the disclosure and figures to reference like components and features.

DETAILED DESCRIPTION

Overview

Learning Latent Semantics for Ranking (LLSR) is a subspace learning algorithm tailored to the ranking task. Using given queries and predetermined training document relevance information, the algorithm leverages such information to learn a tailored latent semantic space such that other documents are better ranked for the queries in the subspace. LLSR enables learning an optimal latent semantic space (LSS) for ranking by utilizing relevance information in the training process of subspace learning.

As used herein, Latent Semantic Space (LSS) is defined for a text corpus by representing both queries and text documents in the Vector Space Model (VSM) through Term Frequency Inversed Document Frequency (TFIDF) indexing. The tools disclosed in the instant patent application can be applied to a plurality of different applications. These applications include applications for search engines, document retrieval from central or distributed sources, document retrieval from a particular website or group of websites from the internet, document retrieval from a database, and document retrieval from an intranet or extranet. Other applications are contemplated.

An environment in which these tools may enable these and other techniques is set forth first below. Additional sections describe various inventive techniques and exemplary embodiments of the tools. These sections describe exemplary ways in which the inventive tools enable learning a tailored latent semantic space such that other documents are better ranked for the queries in the subspace.

Exemplary Operating Environment

Before describing the tools in detail, the following discussion of an exemplary operating environment is provided to assist the reader in understanding at least one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
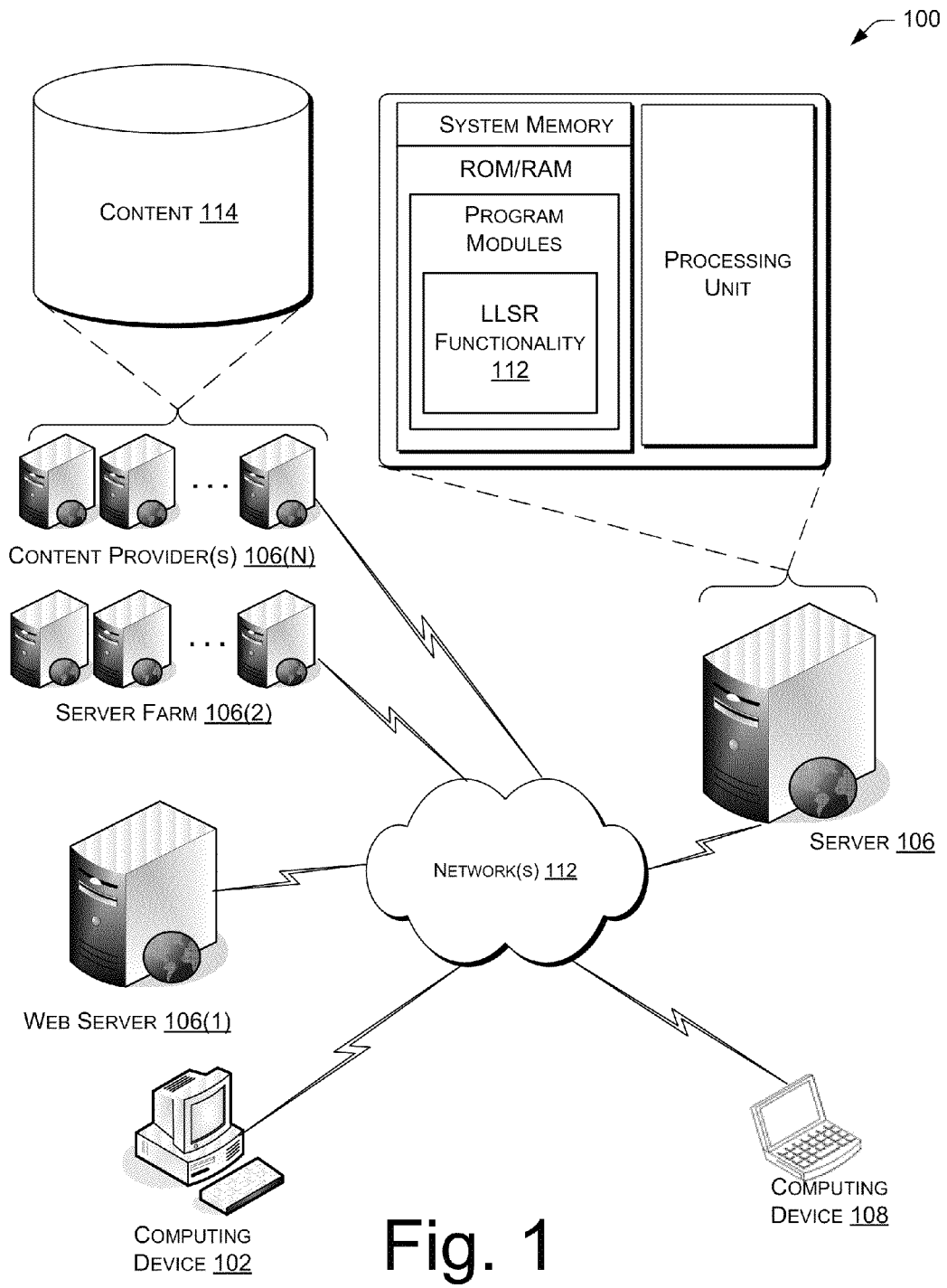
FIG. 1 illustrates an exemplary operating environment for implementing tools applying the latent semantic space for efficient ranking algorithm.

FIG. 1 illustrates one such operating environment generally at 100 comprising at least a first computing device 102 having one or more processor(s) (not shown) and computer-readable media (not shown). Computing device 102 may be one of a variety of computing devices, such as a laptop computer, desktop computer, personal digital assistant, or server. Each computing device having at least one processor capable of accessing and/or executing instructions embodied on the computer-readable media. In at least one embodiment, the computer-readable media comprises or has access to a browser, which is a module or other entity capable of interacting with a network-enabled entity. The computing device may also include input/output devices including a keyboard, mouse, microphone, printer, monitor, and speakers (not shown) useable to implement one or more embodiments of the tools described herein.

The operating environment 100 also comprises one or more network(s) 104 and computing device server(s) 106. The network 104 enables communication between the computing device(s) 102 and the server(s) 106, and can comprise a global or local wired or wireless network, such as the Internet, a local area network (LAN), or an intranet. Computer-readable media of computing device 102 comprises or has access to a browser, which is a module, program, or other entity capable of interacting with a network-enabled entity. In aspects of several embodiments server(s) 106 may be implemented as web server 106(1), in a server farm 106(2), and as content provider(s) 106(N) providing content 114 including text documents upon which a query may be run, and combinations thereof.

In some embodiments, the operating environment 100 may further comprise at least a second computing device 108 having one or more processor(s) and computer-readable media, similar to computing device 102. Each computing device 108 comprises a computing device similar to 102. The computing device(s) 108 may be the same computing device as computing device 102, or can be a separate or different computing device.

Aspects of computing devices, such as computing devices 102, 106, 108, in at least one embodiment include functionality for implementing the LLSR algorithm to obtain the learned subspace for ranking 112. For example, as shown from server 106, program modules can be implemented as computer-readable instructions, various data structures, and so forth via at least one processing unit to configure a computer having system memory to apply the LLSR algorithm as discussed regarding FIG. 3, below.

Exemplary Operation

The following discussion describes exemplary ways in which the tools improve performance of searching and document retrieval tasks utilizing Learning Latent Semantics for Ranking (LLSR) to obtain an optimal Latent Semantic Space (LSS) tailored to the ranking tasks. The optimal LSS for ranking is derived to handle large amounts of training data for practical ranking tasks.

Figure 2:
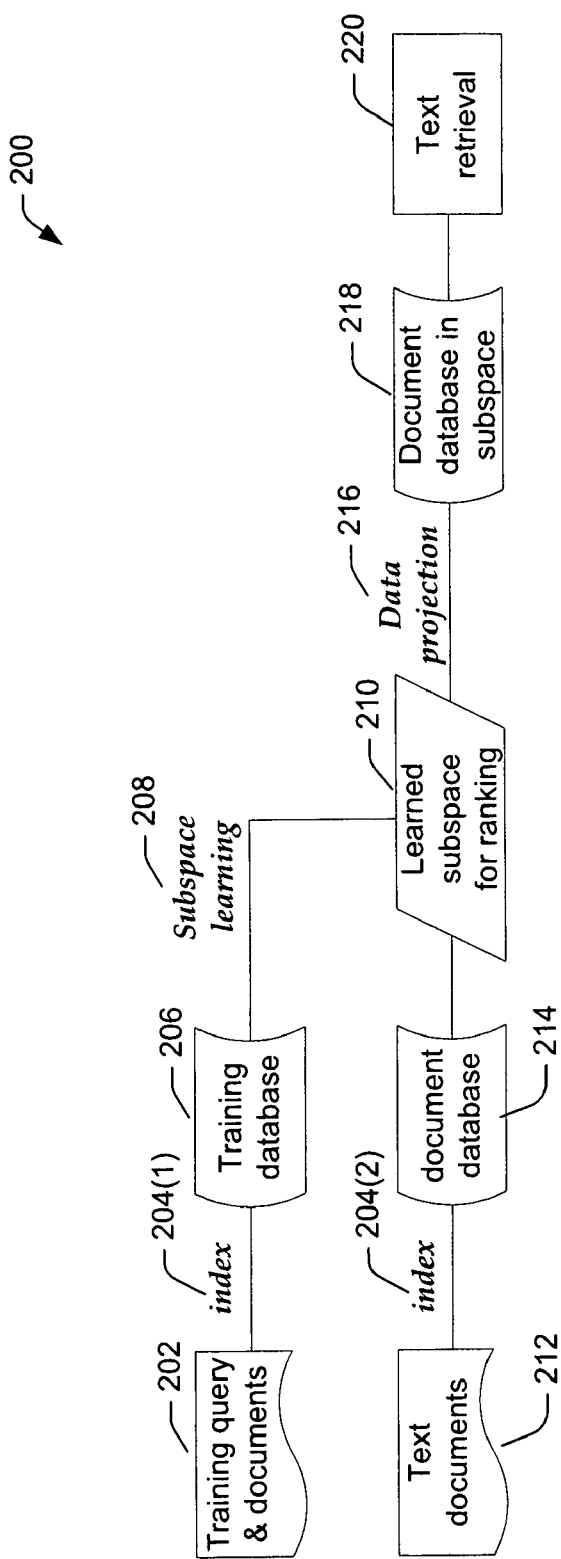
FIG. 2 illustrates an exemplary process flow chart of one embodiment.

FIG. 2 shows an exemplary flow chart 200 of at least one implementation of the described processes and techniques applying the LLSR algorithm. Block 202 represents a training query and documents to be processed as ranked query-document pairs. The training query and documents are indexed at step 204(1) in a vector space model using a known vector space modeling toolkit. Indexing produces a training database represented by block 206. At step 208 application of the LLSR subspace learning algorithm transforms or maps the original high-dimensional training data into another lower-dimensional feature subspace—the learned subspace for ranking represented by block 210.

Block 212 represents text documents upon which a query is run. Text documents 212 are indexed at 204(2) in the vector space model using the same vector space modeling toolkit. Indexing produces a document database represented by block 214. Ordinal information of the text documents 212 from document database 214 is integrated into the ranking task in the learned subspace for ranking represented by block 210, as discussed in detail below regarding Application of the LLSR Algorithm. Step 216 represents projecting data from the learned subspace for ranking 210 to a document database in subspace represented by 218. Block 220 represents ranked text retrieval from documents of the document database in subspace 218 after the LLSR algorithm has been applied to the document database 214. In other words, the subspace is learned at step 208 from the training database 206. The learning results are stored as the learned subspace at block 210. Projection step 216 represents application of the learned subspace 210 to the document database 214 to obtain the projected document database 218. From documents from database 218 ranked text retrieval is represented by block 220.

Exemplary Computing Device

Figure 3:
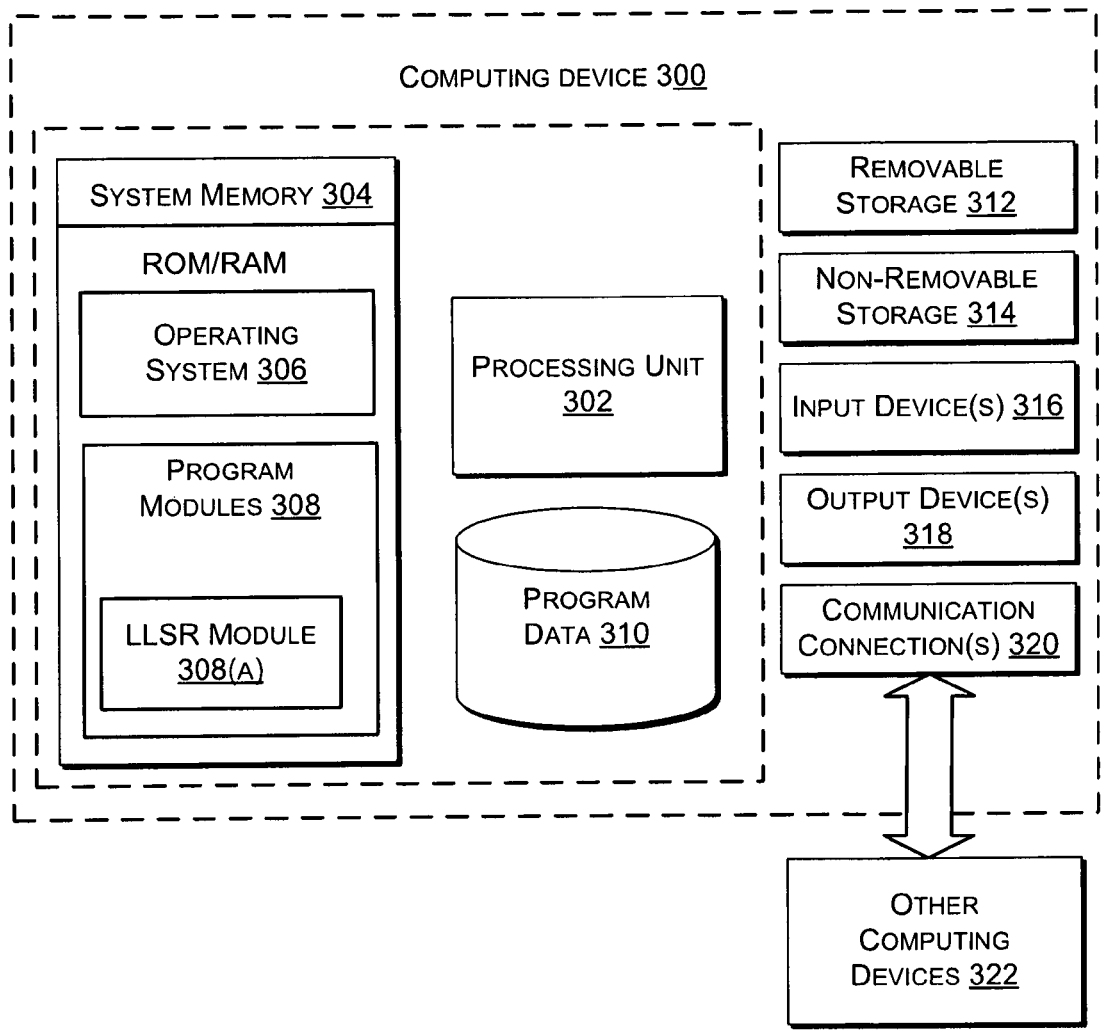
FIG. 3 illustrates an exemplary computing device of one embodiment.

FIG. 3 illustrates an exemplary computing device 300 that can be used to implement aspects of applying the LLSR algorithm as introduced in the context of FIG. 2. For example, this computing device 300 can represent one or more of the computing devices 102, 108, and computing device servers 106 operating in environment 100. (And insofar as the computing device 300 includes conventional computing hardware, FIG. 3 also represents functionality that can be used to implement other computer-related aspects of the environment 100 shown in FIG. 1, such as equipment of web server 106(1), server farm 106(2), and content provider(s) 106(N), and individual computer devices 102 and 108, and so forth). The computing resources shown in FIG. 3 can be implemented at a single site or distributed over plural sites.

The computing device 300 in this example includes at least one processing unit 302 and system memory 304. Depending on the configuration and type of computing device 300, the system memory 304 can be implemented as volatile memory (such as RAM), non-volatile memory (such as ROM, flash memory, etc.), or some combination of the two. The system memory 304 can include an operating system 306, one or more program modules 308, program data 310, and so forth. In the context of the present subject matter, the program modules 308 can include 308(A) the functionality for implementing the LLSR algorithm to obtain the learned subspace for ranking 210 and other aspects of the control stream of FIG. 2 (such as indexing 204, subspace learning 208, and data projection 216). In general, the program modules 308 can be implemented as computer-readable instructions, various data structures, and so forth that configure a computer to apply the LLSR algorithm. The computer-readable instructions can be expressed using any programming technology. The instructions can also include markup language content (e.g., XML).

The computing device 300 can include additional features or functionality. For example, the computing device 300 can also include additional data storage devices, such as removable storage 312 and/or non-removable storage 314 (e.g., magnetic disks, magnetic tape, optical disks, static RAM devices, and so forth), along with associated media reading/writing functionality.

The computing device 300 can also include various input device(s) 316, such as a keyboard, a mouse, a voice input device, a touch input device, and so on. The computing device 300 can also include various output device(s) 318, such as a display, speakers, printer, and so on. Finally, the computing device 300 can also include a communication interface 320 that allows the device 300 to communicate with other computing devices 322 over the network 104 of FIG. 1. The communication interface 320 can be implemented in any fashion, such as broadband (e.g., T1) interface, a telephone modem interface, a cable modem interface, a DSL-type interface, and so forth. One or more bus structures (not shown) internally couple each of the above-described modules together.

Operation

Figure 4:
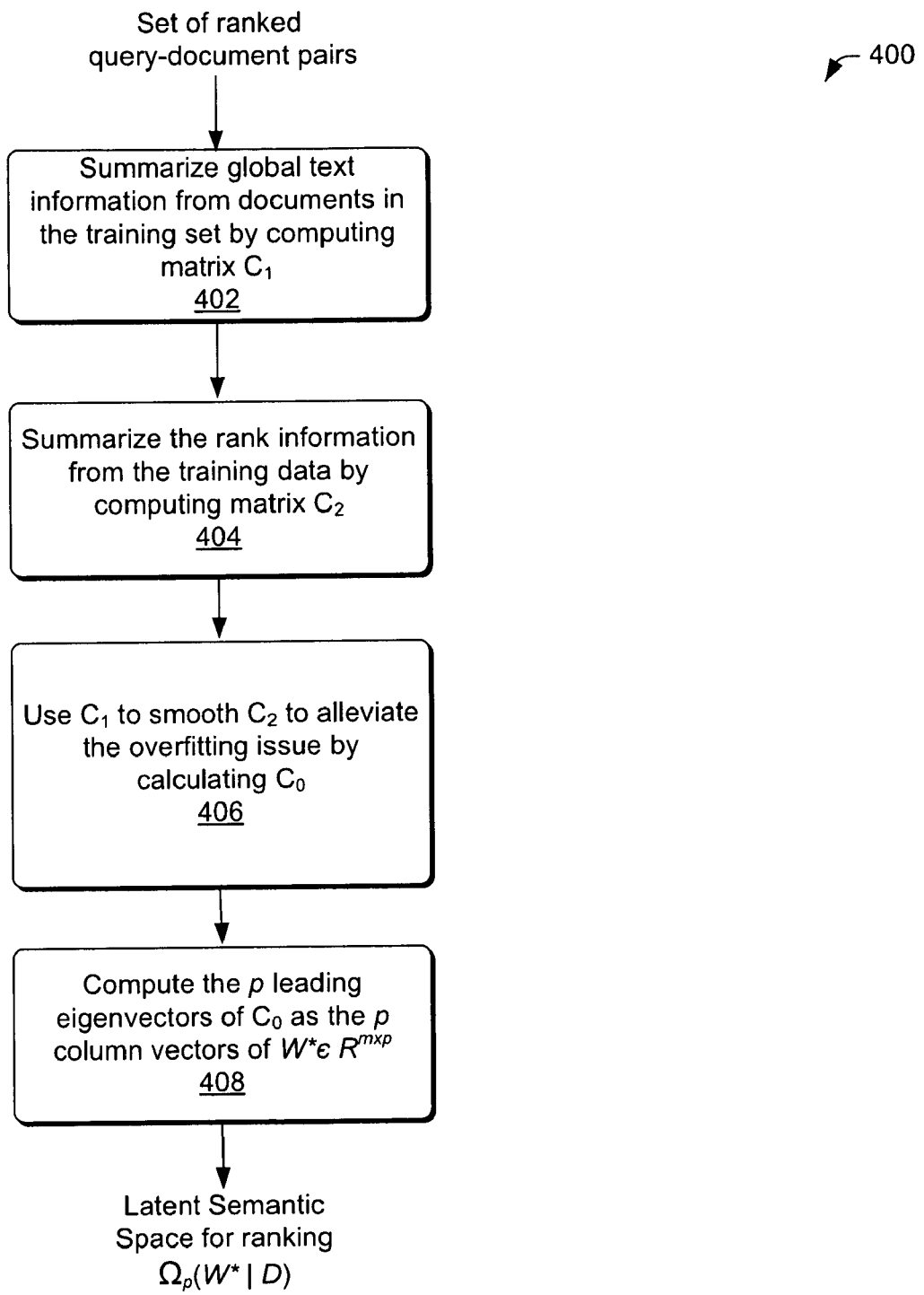
FIG. 4 illustrates an exemplary process for obtaining a latent semantic space for ranking using the LLSR algorithm.

FIG. 4 shows a process 400 for obtaining a latent semantic space for ranking using the LLSR algorithm. To facilitate explanation, the process 400 is described with reference to the environment 100 of FIG. 1 and the computing device of FIG. 3. The process is illustrated as a collection of blocks in a logical flow graph, which represent a sequence of operations that can be implemented by the processing unit 302. In the context of software, the blocks represent computer-executable instructions, such as program modules 308, that, when executed by one or more processors, perform the recited operations. Generally, computer-executable instructions include routines, programs, objects, components, data structures, and the like that perform particular functions or implement particular abstract data types.

Input is made up of a set of ranked query-document pairs. In step 402, global text information from documents in a training set is summarized by computing matrix $C_1$. In step 404, rank information from the training data is summarized by computing matrix $C_2$. In step 406, the processor 302, calculates $C_0$ to alleviate overfitting by using $C_1$ to smooth $C_2$. In step 408 the p leading eigenvectors of $C_0$ are computed as the p column vectors of $W^* \in R^{m \times p}$ to produce the latent semantic space for ranking $\Omega_p(W^*|D)$. The sequence in which the operations are described should not be construed as a limitation, and the described blocks can be combined in any sequence and/or in parallel to implement the process. For example, in at least one embodiment block 402 and block 404 are processed in parallel.

Application of the LLSR Algorithm

In at least one embodiment, a predetermined corpus of text documents is represented by a term by document matrix $D \in R^{m \times n}$ in VSM, where m is the number of terms and n is the number of documents. Each column of D, denoted as $d_i \in R^m$, i=1, 2, . . . , n, stands for a text document. Given a text corpus $D \in R^{m \times n}$, for any real valued matrix $W = \{w_1, w_2, \ldots, w_p\} \in R^{m \times p}$, if W satisfies the constraint that $W^T W = 1$, then the spanned space by column vectors of W, i.e. span$\{w_1, w_2, \ldots, w_p\}$, is a case of p-dimensional Latent Semantic Space (LSS) of D and denoted as $\Omega_p(W|D)$, where $w_i$, i=1, 2, . . . , p are the orthogonal bases of $\Omega_p(W|D)$.

Although $\Omega_p(U_p|D)$ is the optimal LSS for classical LSI, the optimal LSS for different subspace learning algorithms are generally different from each other. For ranking tasks it is not necessary for $\Omega_p(W^*|D)$ to be optimal since $\Omega_p(W^*|D)$ is solved by the objective function $$W^* = \underset{W \in R^{m \times p}}{\mathrm{argmax}} tr\{W^T C_1 W\}, \text{ subject to } W^T W = I$$

which is designed in an unsupervised manner. Where $tr\{\cdot\}$ represents the trace of a matrix, i.e., the summation of all diagonal elements of a matrix. The $\Omega_p(W^*|D)$ is solved by optimizing objective function $$W^* = \underset{W \in R^{m \times p}}{\mathrm{argmax}} tr\{W^T C_1 W\},$$

subject to $W^T W = I$ based on the definition $$C_1 = \frac{1}{n} \sum_{i=1}^{n} d_i d_i^T.$$

Given K queries, denoted as $q_k \in R^m$, k=1, 2, . . . K in the Vector Space Model, whose relevance to some documents have been manually labeled, the LLSR algorithm for ranking tasks is used to learn from these K labeled queries to obtain the optimal LSS for ranking new documents. The relevance between a document and a query can be quantitatively calculated from their similarity or dissimilarity measurement. In an at least one implementation LLSR uses the Euclidean distance to measure the relevance between a query and a document. Cosine similarity as is used by traditional LSI will result in prohibitively high computation cost for the LLSR algorithm due to the lack of a closed-form solution.

For a given Latent Semantic Space $\Omega_p(W|D)$, the queries and documents projected in this semantic space can be represented by $q_k'=W^T q_k \in R^p$ and $d_i'=W^T d_i \in R^p$ for all pairs of k and i. In terms of Euclidean distance, the dissimilarity between $q_k'$ and $d_i'$ is $\|q_k'-d_i'\|=(q_k'-d_i')^T(q_k'+-d_i')$. Given a query denoted as $q_k$, if the labeled data indicate that $d_i$ should be ranked higher than $d_j$, i.e. $d_i \succ d_j$, an optimal LSS $\Omega_p(W|D)$ for the ranking tasks should satisfy the following inequality:

$$\|q_k'-d_j'\|^2 - \|q_k'-d_i'\|^2 > 0. \quad (1)$$

it is $(q_k'-d_j')^T(q_k'-d_j') - (q_k'-d_i')^T(q_k'-d_i') > 0$, which means $d_i'$ should be closer to $q_k'$ than $d_j'$ in the derived LSS. The left side of inequality (1) can be rewritten as $$(q_k' - d_j')^T (q_k' - d_j') - (q_k' - d_i')^T (q_k' - d_i') =$$
$$-2q_k'^T d_j' + d_j'^T d_j' + 2q_k'^T d_i' - d_i'^T d_i' =$$
$$(2q_k' - d_i' - d_j')^T (d_i' - d_j') = (2W^T q_k - W^T d_i - W^T d_j)^T (W^T d_i - W^T d_j) =$$
$$(2q_k - d_i - d_j)^T W W^T (d_i - d_j) = tr\{W^T((2q_k - d_i - d_j)(d_i - d_j)^T)W\}.$$

In order to take all these pairs into consideration, LLSR maximizes the average of the pair-wise labeled information of query $q_k$ as $$\frac{1}{|d_i \succ d_j : q_k|} \sum_{d_i \succ d_j : q_k} tr\{W^T((2q_k - d_i - d_j)(d_i - d_j)^T)W\}\xi_{kij}, \quad (2)$$

where $d_i \succ d_j : q_k$ means all the pair-wise ranked data for query $q_k$ and $|d_i \succ d_j : q_k|$ is the number of these pairwise labeled data. The $\xi_{kij}$ is a weight to characterize the importance of a ranked pair for a given query. For example, for a given query $q_k$, if $d_i$ is strongly relevant, $d_{j1}$ is weak relevant and $d_{j2}$ is irrelevant, the difference between $d_i$ and $d_{j2}$ should be larger than the difference between $d_1$ and $d_{j1}$. Thus the weight $\xi_{kij_2} > \xi_{ki_1}$, is required in the objective function. In at least one implementation of LLSR, we the weight is set as $\xi_{kij}=\exp\{\alpha |r_i - r_j|\} - 1$, where $|r_i - r_j|$ represents the difference between the ranks of $d_i$ and $d_j$. If $d_i$ and $d_j$ have the same rank for query $q_k$, $\xi_{kij}=0$. $\alpha$ is a parameter and we set $\alpha=\log_e 2$ in all the experiments such that we can have $\xi_{kij}=1$ if $|r_i - r_j|=1$.

Since $tr\{\cdot\}$ is a linear operator, the average of the objective functions for all queries can be calculated as $$\frac{1}{K} \sum_{q_k} \frac{1}{|d_i \succ d_j : q_k|} \sum_{d_i \succ d_j : q_k} tr\{W^T((2q_k - d_i - d_j)(d_i - d_j)^T)\xi_{kij} W\} = \quad (3)$$
$$tr\left\{W^T \left(\frac{1}{K} \sum_{q_k} \frac{1}{|d_i \succ d_j : q_k|} \sum_{d_i \succ d_j : q_k} \xi_{kij}(2q_k - d_i - d_j)(d_i - d_j)^T\right) W\right\}.$$

In at least one implementation the learning objective for ranking is to maximize Eqn. (3).

Let $$C_2 = \frac{1}{K} \sum_{q_k} \frac{1}{|d_i \succ d_j : q_k|} \sum_{d_i \succ d_j : q_k} \xi_{kij}(2q_k - d_i - d_j)(d_i - d_j)^T,$$

then the problem is formulated as $$W^* = \underset{W \in R^{m \times p}}{\mathrm{argmax}}\, tr\{W^T C_2 W\}, \text{ subject to } W^T W = I. \quad (4)$$

The objective function for LSI, $$W^* = \underset{W \in R^{m \times p}}{\mathrm{argmax}}\, tr\{W^T C_1 W\}, \text{ subject to } W^T W = I,$$

does not consider any ranking information of the training data; while Eqn. (4), an objective function tailored to the ranking, well utilizes the ranking information involved in the training data. However, the generalizability of the objective function in Eqn. (4) is highly constrained by the training data. The LSS derived from Eqn. (4) is easy to overfit to the training data. In order to alleviate the overfitting issue, Eqn. (4) is integrated with $$W^* = \underset{W \in R^{m \times p}}{\mathrm{argmax}}\, tr\{W^T C_1 W\}, \text{ subject to } W^T W = I$$

as a unified objective function. In other words, the tool facilitates learning an LSS through optimizing a unified objective function which considers both ranking information of the training query-document pairs and the global information of all documents in the training set. The optimal LSS for ranking is defined as $\Omega_p(W^*|D)$, where $$W^* = \underset{W \in R^{m \times p}}{\mathrm{argmax}}\, tr\{W^T(\beta\delta C_1 + (1-\beta)C_2)W\}, \text{ s.t. } W^T W = 1 \quad (5)$$

where $\beta$ is a parameter ranging between 0 and 1 for balancing the label information and the global information. $\delta$ is a scaling factor which is used to guarantee the elements of $C_1$ and $C_2$ are in the same scale. The $\delta$ is computed by $\delta = \|C_2\|/\|C_1\|$, where $\|\cdot\|$ is the Frobenius norm of a matrix. In Eqn. (5), if $\beta=0$, it is the objective function (4). If $\beta=1$, it is exactly the traditional LSI. In the next subsection, the closed-form solution of Eqn. (9) is derived and the Learning Latent Semantics for Ranking (LLSR) algorithm is summarized.

For any real valued symmetric matrix $C \in R^{m \times m}$, the solution of $$W^* = \underset{W \in R^{m \times p}}{\mathrm{argmax}}\, tr\{W^T C W\}$$

consists of the p leading eigenvectors of C, i.e. the p column vectors of $W^*$ are the p leading eigenvectors of C. Given the case that the decomposition of C is $C = XX^T$, the p columns of $W^*$ are the p left singular vectors correspond to the p largest singular values of C.

For any given real matrix, $C \in R^{m \times m}$ we have the conclusion that, $$tr\{W^T C W\} = tr\left\{W^T \frac{1}{2}(C + C^T)W\right\}.$$

Since $C_1$ is a symmetric matrix, $$\underset{W \in R^{m \times p}}{\operatorname{argmax}} tr\{W^T(\beta \delta C_1 + (1-\beta)C_2)W\} = \qquad (6)$$

$$\underset{W \in R^{m \times p}}{\operatorname{argmax}} tr\left\{W^T\left(\beta \delta C_1 + \frac{1}{2}(1-\beta)(C_2 + C_2^T)\right)W\right\}.$$

Let $$C_o = \beta C_1 + \frac{1}{2}(1-\beta)(C_2 + C_2^T),$$

then $C_0$ is a symmetric matrix, and the optimization of the objective function (4) is equal to $$W^* = \underset{W \in R^{m \times p}}{\operatorname{argmax}} tr\{W^T C_0 W\}, \text{ subject to } W^T W = I \qquad (7)$$

The solution $W^*$ for the optimization problem (7) consists of the p largest eigenvectors of the matrix $C_0$, i.e., $\Omega_p(W^*|D)$ is spanned by the p leading eigenvectors of $C_0$. This theorem can be derived from Eqn (7). In other words, the latent semaint indexing can be reformulated as an optimization problem by Eqn. (7), proving that the latent semantic space of LSI is spanned by the column vectors for the matrix $W^*$, which maximizes $tr\{W^T C_1 W\}$ among all possible subspaces. Since $$C_1 = \frac{1}{n}\sum_{i=1}^{n} d_i d_i^T = \frac{1}{n}DD^T, C_1 = \frac{1}{n}U\Sigma^2 U.$$

Therefore, $W = U_p$. Thus, the solution from $$W^* = \underset{W \in R^{m \times p}}{\operatorname{argmax}} tr\{W^T C_1 W\}, \text{ subject to } W^T W = I$$

and LSI are the same. This provides the closed-form solution to the optimization problem defined in Eqn. (7). The key steps for the Learning Latent Semantics for Ranking (LLSR) algorithm are summarized in Table 1, below.

TABLE 1

LLSR Algorithm

Inputs: A set of ranked query-document pairs.
Output: Latent Semantic Space for ranking $\Omega_p(W^* | D)$.
Step-1: Summarize global text information from all documents in the training set by computing matrix $C_1$ in Eqn. (3).
Step-2: Summarize the rank information from the training data by computing matrix $C_2$ in Eqn. (7).
Step-3: Use $C_1$ to smooth $C_2$ for alleviating the overfitting issue by calculating $C_0$.
Step-4: Compute the p leading eigenvectors of $C_0$ as the p column vectors of $W^* \in R^{m \times p}$.

Both queries and documents can be projected into the derived LSS $\Omega_p(W^*|D)$ as $q_k' = W^{*T}q_k$ and $d_i' = W^{*T}d_i$, and the relevance between the query-document pair may be measured by the Cosine similarity $$\text{Cos} <q', d_i'> = \frac{<q', d_i'>}{\|q'\|\|d_i'\|}.$$

The computational cost of LLSR algorithm mainly lies within two parts. The first part is the computation of the matrix $C_0$, and the second part is to calculate the eigenvectors of the matrix $C_0$. Complexity of the LLSR algorithm is very close to the classical LSI algorithm, which is O(m3).

Exemplary Results

Figure 5:
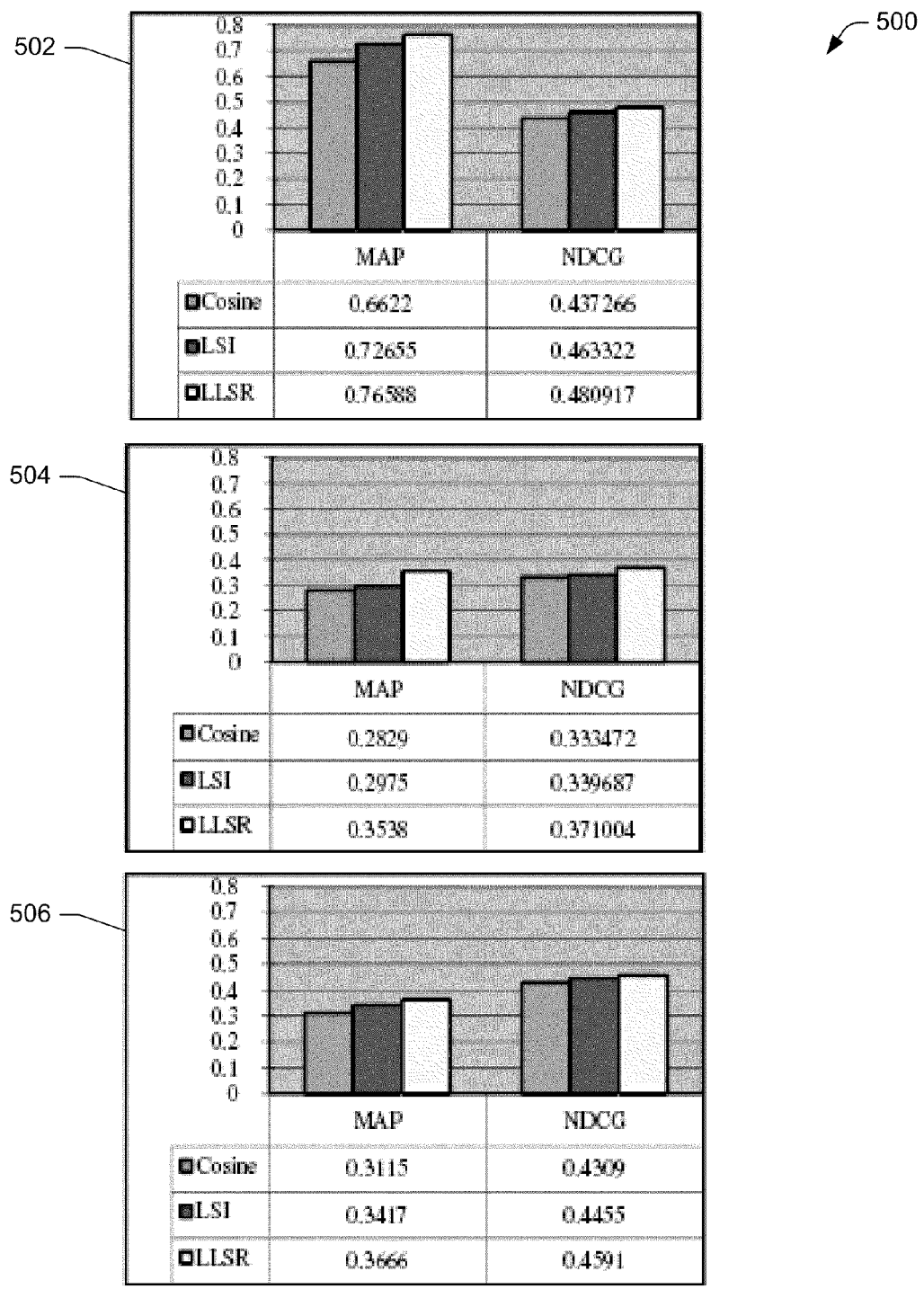
FIG. 5 illustrates results of applying LLSR compared with two baseline algorithms on three text datasets.
Figure 6:
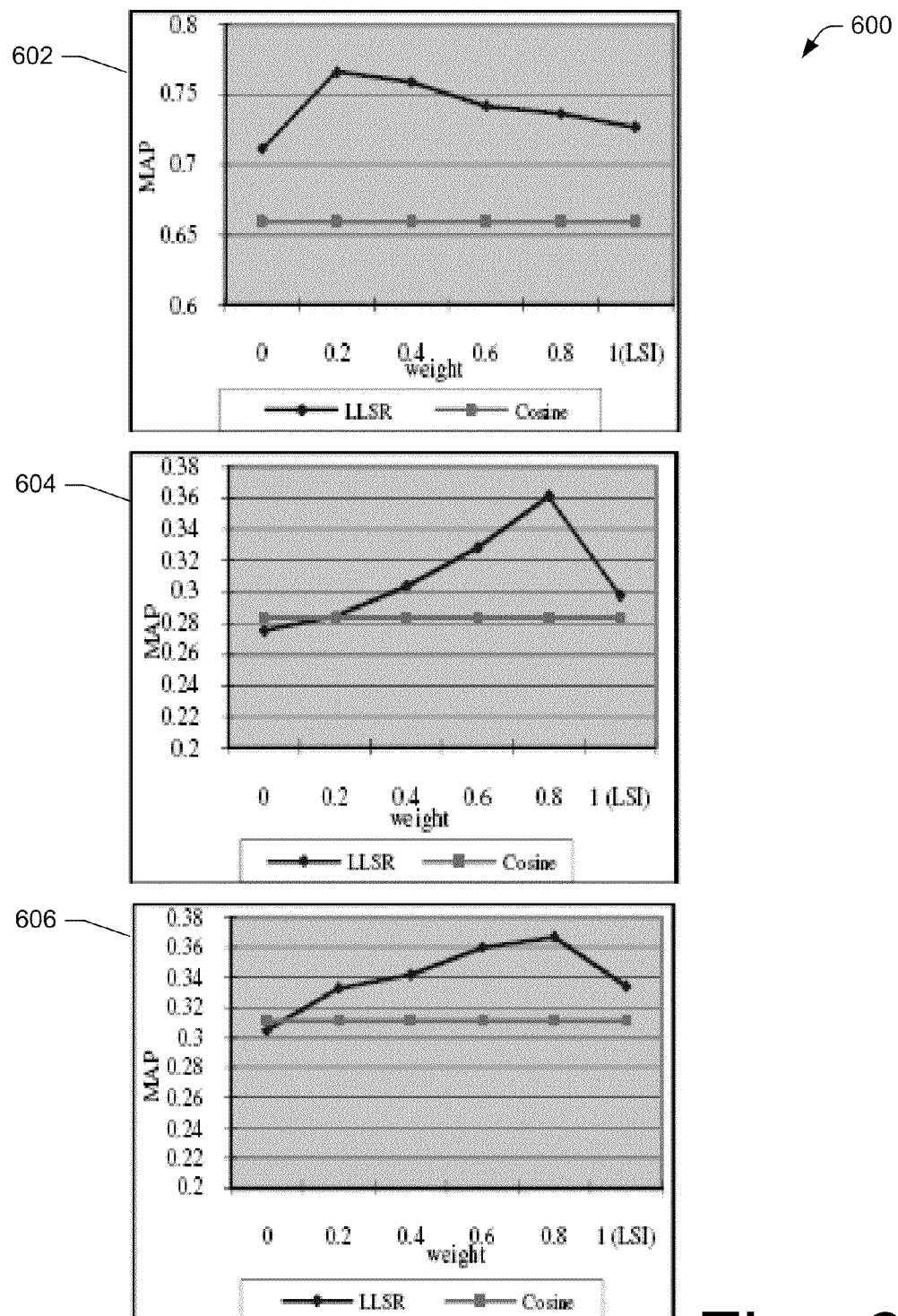
FIG. 6 illustrates sensitivity of LLSR to the parameter β in terms of mean average precision (MAP).
Figure 7:
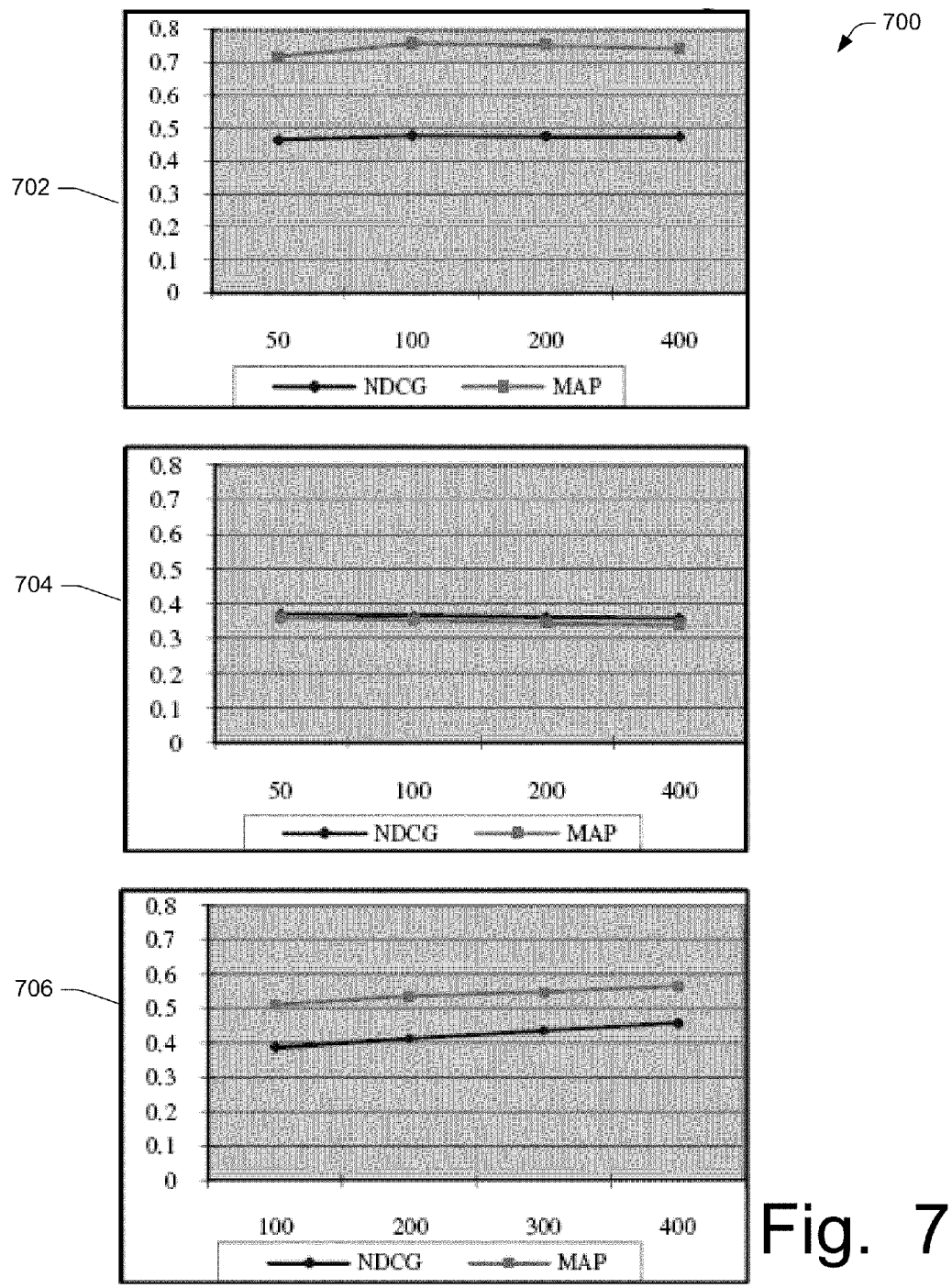
FIG. 7 illustrates sensitivity of LLSR to the dimension of latent semantic space.

Exemplary results are described herein with reference to FIGS. 5-7. For application of the LLSR algorithm, text documents may be indexed in a vector space model using a known vector space modeling toolkit. Also, a known approach to Singular Value Decomposition may be used. In at least one implementation of the LLSR algorithm performance was evaluated favorably compared to the Cosine similarity and classical LSI. Implementation of the LLSR algorithm comprises two main steps: subspace-learning and ranking. In at least one embodiment a performance evaluation step is also performed. The learning step is implemented to learn the Latent Semantic Space from the training data. The ranking step projects the queries and text documents into the learned LSS and ranks the projected documents by their relevance to the given query. In at least one embodiment the relevance may be measured by Cosine similarity.

The optional evaluation step uses criteria to measure ranking performance. For example, two known criteria used to measure ranking performance in at least one implementation are Mean Average Precision (MAP) and Normalized Discount Cumulative Gain (NDCG).

Two parameters may affect the final results of the LLSR algorithm. One is the parameter β in Eqn. (4), which is used for balancing the label information for rank learning and global information of all documents. The other is the dimension of the subspace.

Implementations illustrated in FIG. 5 are computed based on manually tuned parameters. Parametric sensitivity of the LLSR algorithm is illustrated in FIGS. 6 and 7.

FIG. 5 illustrates examples of results of LLSR compared with two baseline algorithms on three text datasets. Performance of application of the LLSR algorithm may be evaluated based on known datasets.

The first two datasets are subsets of the SMART dataset available from Microsoft Research, "SIGIR 2007 Workshop Learning to Rank for Information Retrieval." The third dataset is sampled from the well-known TREC3. The two sub-collections of the SMART dataset have been commonly used for LSI study. The first is the MED set with 1,033 documents, 9,466 terms, and 30 queries. The second is the CISI with 1,460 documents, 7,276 terms, and 35 queries. Each dataset was randomly split into 5 folds and each time 4 of them are used for subspace learning, and the remaining fold was used for testing. The particular implementation examples illustrated in FIGS. 5, 6, and 7 are the averages of these five runs. The t-test is used to show the improvement of LLSR is statistically significant. For the third dataset, at most one-hundred relevant documents for each query in CD1 and CD2 of the TREC3 dataset were randomly sampled as the training set. For some queries, the number of relevant documents is smaller than one-hundred, then all relevant documents for this kind of queries were used as the training set. Additionally some documents which are irrelevant to any queries into the training set were added. The final size of the training set was 10,000 for the third corpus. Documents from the CD3 of the TREC3 were randomly sampled five times, each time 5,000 documents were randomly sampled for the evaluation of algorithmic performance.

Comparison of LLSR with two types of baseline algorithms are illustrated in FIGS. 5, 6, and 7. The first baseline algorithm, which is referred to as Cosine, directly uses the Cosine similarity between queries and documents in the original term space for calculating the relevance. The second baseline algorithm, which is referred to as LSI, is a conventional subspace learning algorithm. LSI is among but a few subspace learning algorithms which have been applied for text Information Retrieval.

Mean Average Precision (MAP) and Normalized Discount Cumulative Gain, for ranking tasks illustrate a measure of the algorithmic performance. Precision at K (Pre@K) is a measure on how well the system performs in not returning irrelevant documents to the user given query in the top K results. Mean Average Precision is defined through Pre@K as $$Pre@K = \frac{\text{\# relevant documents in top } K \text{ results}}{K}.$$

Mean Average Precision (MAP): For a given query, the Average Precision (AP) is the average of the Pre@K for all K if the kth result is relevant, $$AP = \frac{\sum_{K:\ the\ k^{th}\ result\ is\ relevant} Pre@K}{\text{\# relevant results}}.$$

The MAP is the average AP of all testing queries. Normalized Discount Cumulative Gain (NDCG): NDCG is used for search performance evaluation. For a given query q, the NDCG is computed as $$N_q = M_q \sum_{j=1}^{k} \frac{2^{label(j)} - 1}{\log_b(j+1)}$$

where $M_q$ is the normalization constant chosen to guarantee that a perfect ordering of the results for the query q will receive the NDCG score of 1. label(j) is a relevance score of result returned at position j. The base of the logarithm, b, controls the amount of the reduction. In at least one implementation b=2 is used, which corresponds to a sharper discount. However, different discounts are possible.

FIG. 5 illustrates results of applying LLSR compared with two baseline algorithms on three text datasets generally at 500. 502 shows the results of applying LLSR on the MED dataset. 504 shows the results of applying LLSR on the CISI dataset. 506 shows the results of applying LLSR on the TREC3 dataset. The MAP and NDCG are used for algorithmic performance evaluation. The parameter b=0.8 is used for MED, b=0.2 is used for both CISI and TREC. For the small scale MED and CISI datasets shown in 502 and 504, respectively, one-hundred dimensional latent semantic spaces were preserved. While for the relatively larger TREC3 dataset shown in 506, the dimension of the latent semantic space is correspondingly set to be a larger number of four-hundred. From 500 generally and each of 502, 504, and 506, we can see that the classical LSI can improve ranking performance in contrast to Cosine similarity without subspace learning. 500 generally and each of 502, 504, and 506, also illustrate how applying the LLSR algorithm, which is tailored to the ranking task, further improves performance in the ranking tasks over LSI.

As FIG. 5 illustrates, improvements vary on different datasets. Improvements may range from about 3% to more than 90% in some embodiments, e.g., 2.5%, 3%, 3.7%, 5%, 8.5% 9%, 12.1%, 13.3%, 17%, 25%, 50%, 90%, and percentages between these.

For example, in 502, illustrating measurement of performance of applications of the algorithms to the MED dataset, the MAP shows that LLSR improved 15.8% over Cosine and 6.1% over LSI. As another example, in 504, illustrating the CISI dataset, the MAP improvement is as high as 25.1% over Cosine and 18.9% 6.1% over LSI. As yet another example, in 506, illustrating the TREC3 dataset, the MAP improvement over direct Cosine ranking is 17.7% and over LSI is 7%. These examples illustrate that the performance of LLSR is better by statistically significant measure than both the commonly used LSI and Cosine based algorithms without subspace learning in the ranking tasks.

The t-test results of MAP and NDCG are shown below, in Table 1, which demonstrates the statistical significance of the results shown in FIG. 5.

|  | LLSR vs. Cosine | | LLSR vs. LSI | |
| --- | --- | --- | --- | --- |
|  | MAP | NDCG | MAP | NDCG |
| MED | 0.008471 | 0.028885 | 0.021547 | 0.050712 |
| CISI | 0.000787 | 0.000328 | 0.00053 | 0.001188 |
| TREC3 | 0.009376 | 0.010325 | 0.023376 | 0.040071 |

Table 1, demonstrates that almost all improvements are significant on the three datasets using 0.05 as a threshold to judge whether the results are statistically significant. The result for the improvement of LLSR in contrast to LSI in terms of NDCG on the MED data 502, represents a possible outlier. 0.050172 being very near in proximity to the threshold of 0.05. Moreover, for this specific case, when randomly re-splitting the MED data into 5 folds and redoing the experiments again for evaluating the NDCG performance, the t-test with result of 0.04976 may be obtained. FIG. 5 and Table 1 illustrate examples of the benefits obtained from LLSR improving the ranking performance compared to the LSI and Cosine without subspace learning.

FIG. 6 illustrates the sensitivity of the LLSR algorithm to the algorithmic parameters compared with the Cosine baseline algorithm generally at 600, for example, on the same three text datasets as FIG. 5. 602 shows the results of applying LLSR on the MED dataset. 604 shows the results of applying LLSR on the CISI dataset. 606 shows the results of applying LLSR on the TREC3 dataset. In these examples, MAP is used to illustrate the algorithmic sensitivity to parameter β. NDCG or other measures of the algorithmic performance may also be used to illustrate similar trends.

The MAPs of the LLSR algorithm with different β values are shown in FIG. 6. According to Eqn. (4), the weight β=1 stands for the classical LSI and β=0 stands for the case where only label information in the training data is used for subspace learning. 600 generally illustrates the importance of the weighting parameter to the final ranking performance. For example, as illustrated with the MED dataset at 602, relatively smaller weight for the regularization factor leads to better performance. However, the other two exemplary datasets illustrated by 604 and 606, show a preference for higher weight of the regularization factor.

The examples shown in 600 illustrate the following: (1) Neither β=0 nor β=1 achieve the best performance for the ranking task because the LLSR algorithm may be easy to overfit to the training data without the regularization of LSI. On the other hand, LSI itself does not achieve the best performance due to disregarding ranking information. (2) When the measured performance of LLSR with β=0 is worse than Cosine the larger β may provide better performance. Otherwise, smaller β provides better performance. As shown in 602, β=0 performing well means the learned latent semantic space does not seriously overfit to the training data. Thus smaller regularization can achieve better performance.

Embodiments implementing the LLSR algorithm achieve optimal performance either close to 0 or close to 1. In at least one embodiment the parameter β is tuned according to the performance at β=0. If the measured performance is good, a value of about, but slightly larger than 0, e.g., one of 0.1, 0.2, and 0.3 is assigned to β. If the measured performance is not good, a value of about, but slightly smaller than 1, e.g., one of 0.9, 0.8, and 0.7 is assigned to β. Good performance is measured, for example, via MAP and NDCG. In at least one embodiment, the larger the MAP or NDCG, the better performance the LLSR has achieved.

The sensitivity of LLSR to the dimension of latent semantic space is shown in FIG. 7, generally at 700. The parameter illustrated, the dimension of the latent semantic space learned by LLSR, is illustrated with the MED dataset 702, for example. Sensitivity of LLSR is also illustrated in examples showing the CISI dataset 704, and TREC3 dataset 706. The best β of each dataset may be used to analyze the effect of the subspace dimension of LLSR on the algorithmic performance.

700 shows that the ranking performance is relatively stable even with changes of the subspace dimension learned by LLSR algorithm. For example, at 702 on the MED dataset, the NDCG in the 50 and 400 dimensional subspaces learned by LLSR are 0.484 and 0.485 respectively. The NDCG shows minimal change although the number of dimensions increased 8 times from 50 to 400. Increases in subspace dimension may increase the MAP in some implementations, however the increases are not statistically significant. For example, the MAP increases slightly from about 0.512 to about 0.559 with the increase of subspace dimension on TREC3 shown at 706. For example, for the larger scale data, the rank of $C_0$ in Eqn. (5) is higher, and hence more eigenvectors can reserve more information of original data for ranking.

CONCLUSION

The above-described systems and methods ("tools") enable leveraging labeled relevance information in the training process of subspace learning, such that the learned latent semantic space is tailored to the ranking problem. These and other techniques described herein may provide significant improvements over the current state of the art, by leveraging the labeled query-document pairs with relevance information, thereby discovering and developing a new application of the Learning Latent Semantics for Ranking algorithm tailored to the ranking task.

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

We claim:

1. A computer-implemented method of subspace learning for ranking, the method comprising:
    learning from a plurality of labeled queries;
    applying the learning from the labeled queries for ranking unranked documents;
    obtaining, via the applying, a learned latent semantic space (LSS) for ranking unranked documents;
    providing ranking for unranked documents in the learned LSS;
    reporting the learned LSS including the unranked documents based at least in part on the ranking.

2. The method as recited in claim 1 further comprising:
    maximizing an average of pair-wise labeled information of a query such that $$\frac{1}{|d_i > d_j : q_k|} \sum_{d_i > d_j : q_k} tr\{W^T((2q_k - d_i - d_j)(d_i - d_j)^T)W\}\xi_{kij}$$

represents the pair-wise ranked data for the query represented as $q_k$, wherein:
    $|d_i < d_j : q_k|$ represents the number of the pair-wise labeled data, and
    $\xi_{kij}$ represents a weight characterizing importance of a ranked pair for a given query.

3. The method as recited in claim 2 wherein optimizing $$\frac{1}{|d_i > d_j : q_k|} \sum_{d_i > d_j : q_k} tr\{W^T((2q_k - d_i - d_j)(d_i - d_j)^T)W\}\xi_{kij}$$

embodies a closed form solution.

4. The method as recited in claim 1 further comprising calculating relevance between a document and a query based on a similarity measurement or a dissimilarity measurement.

5. The method as recited in claim 1 further comprising calculating relevance between a document and a query using Euclidean distance.

6. The method as recited in claim 1 wherein a labeled query denotes relevance to at least one document.

7. The method as recited in claim 1 wherein at least one labeled query has been manually labeled.

8. A memory storing instructions for implementing the method of claim 1.

9. A memory having computer-executable instructions embodied thereon, the computer-executable instructions to configure a computer to perform acts comprising:
    subspace learning for ranking; and
    returning a search based at least in part on the subspace learning for ranking.

10. The memory as recited in claim 9 wherein the subspace learning for ranking is tailored for ranking based at least in part on labeled relevance information obtained during the training process of subspace learning.

11. The memory as recited in claim 9 wherein the subspace learning for ranking further comprises:
    learning from a plurality of labeled queries; and
    applying the learning from the labeled queries for ranking unranked documents.

12. The memory as recited in claim 9 wherein the acts further comprise:
    obtaining a training query and documents to be processed as ranked query-document pairs;

indexing the training query and documents as training data in a vector space model having a dimension;

producing a training database via the indexing;

applying a learning latent semantic space for ranking algorithm;

receiving ordinal information of indexed documents;

integrating the ordinal information of the indexed documents into ranking in a learned subspace for ranking;

projecting data from the learned subspace for ranking to a document database; and reporting the learned subspace including unranked documents.

13. The memory as recited in claim 12 wherein the reporting comprises ranked text retrieval.

14. The memory as recited in claim 12 wherein the reporting the learned subspace including unranked documents is based at least in part on the ranking.

15. The memory as recited in claim 12 wherein applying the learning latent semantic space for ranking algorithm transforms the training data to a lower-dimensional feature subspace.

16. A computing device comprising:

the memory comprising the computer readable media as recited in claim 9; and a processor operably coupled to the memory that upon executing the computer-executable instructions configures the computing device as the computer to perform the subspace learning for ranking.

17. A method comprising:

receiving as a training set, a set of ranked query-document pairs;

summarizing global text information from documents in the training set by computing a first matrix;

summarizing rank information from the training data by computing a second matrix;

applying the first matrix to the second matrix to smooth the second matrix to obtain a third matrix;

computing eigenvectors of the third matrix as column vectors of a subspace; and reporting the subspace as a latent semantic space for ranking.

18. The method of claim 17 wherein smoothing the second matrix alleviates overfitting.

19. The method of claim 17 wherein the latent semantic space satisfies $\|q_k'-d_j'\|^2 - \|q_k'-d_i'\|^2 > 0$.

20. The method of claim 17 wherein the latent semantic space for ranking is defined as $\Omega_p(W^*|D)$ where $W^* = \mathrm{argmax}_{W \in R^{m \times p}} \mathrm{tr}\{W^T(\beta \delta C_1 + (1-\beta)C_2)W\}$ such that $W^T W = I$.

* * * * *